(12) United States Patent
Guo et al.

(10) Patent No.: US 10,587,604 B2
(45) Date of Patent: Mar. 10, 2020

(54) DEVICE VERIFICATION METHOD AND APPARATUS

(71) Applicant: ALIBABA GROUP HOLDING LIMITED, George Town, Grand Cayman (KY)

(72) Inventors: Honghai Guo, Hangzhou (CN); Xiaofeng Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 264 days.

(21) Appl. No.: 15/625,996

(22) Filed: Jun. 16, 2017

(65) Prior Publication Data

US 2017/0289139 A1  Oct. 5, 2017

Related U.S. Application Data

(63) Continuation of application No. PCT/CN2015/096797, filed on Dec. 9, 2015.

(30) Foreign Application Priority Data

Dec. 18, 2014 (CN) .......................... 2014 1 0797833

(51) Int. Cl.
*H04L 29/06* (2006.01)
*G06F 21/57* (2013.01)

(52) U.S. Cl.
CPC .......... *H04L 63/0823* (2013.01); *G06F 21/57* (2013.01); *H04L 29/06* (2013.01);
(Continued)

(58) Field of Classification Search
CPC . H04L 63/0823; H04L 29/06; H04L 63/0853; H04L 63/0876; H04L 9/3263;
(Continued)

(56) References Cited

U.S. PATENT DOCUMENTS

| 2004/0054913 A1 | 3/2004 | West |
| 2005/0102522 A1 | 5/2005 | Kanda |

(Continued)

FOREIGN PATENT DOCUMENTS

| CN | 103023876 A | 4/2013 |
| CN | 103024090 A | 4/2013 |

(Continued)

OTHER PUBLICATIONS

Extended European Search Report pursuant to Rule 62 EPC, the Supplementary European Search Report (Art. 153(7) EPC) and the European Search Opinion issued in International Application No. 15869247.5-1853 / 3236630; dated Dec. 5, 2017 (7 pgs.).

(Continued)

*Primary Examiner* — Yogesh Paliwal
(74) *Attorney, Agent, or Firm* — Finnegan, Henderson, Farabow, Garrett & Dunner, LLP

(57) ABSTRACT

The present invention provides device verification methods and apparatuses, wherein the device verification methods are used for verifying a target device requesting performing a target service, one method including: receiving a device verification request sent by the to-be-verified target device, the device verification request including: a device certificate and first device attribute information of the target device, and the device certificate including a device fingerprint generated according to second device attribute information; and when it is confirmed according to the device fingerprint that the device certificate is valid, and the device fingerprint matches the first device attribute information, determining that the device certificate is a certificate of the target device, and allowing the target device to perform the target service. The present invention makes device verification more reliable.

14 Claims, 7 Drawing Sheets

(52) U.S. Cl.
CPC ...... *H04L 63/0853* (2013.01); *H04L 63/0876*
(2013.01); *G06F 2221/034* (2013.01)

(58) Field of Classification Search
CPC . H04L 9/3268; G06F 21/57; G06F 2221/034;
G06F 21/44; H04W 12/06
See application file for complete search history.

(56) References Cited

U.S. PATENT DOCUMENTS

| | | | |
|---|---|---|---|
| 2005/0144440 | A1 | 6/2005 | Catherman et al. |
| 2005/0216738 | A1 | 9/2005 | Kita et al. |
| 2007/0226787 | A1* | 9/2007 | Maletsky ................ G06F 21/32 726/9 |
| 2011/0093920 | A1 | 4/2011 | Etchegoyen |
| 2012/0204033 | A1 | 8/2012 | Etchegoyen et al. |
| 2014/0351912 | A1* | 11/2014 | Fu ...................... H04L 63/0823 726/7 |

FOREIGN PATENT DOCUMENTS

| | | | |
|---|---|---|---|
| CN | 103414699 | A | 11/2013 |
| CN | 104184713 | A | 12/2014 |
| GB | 2434724 | A | 8/2007 |
| JP | H10-260939 | A | 9/1998 |
| JP | 2002-236522 | A | 8/2002 |
| JP | 2005150888 | A | 6/2005 |
| JP | 2006-323860 | A | 11/2006 |
| JP | 2014-174560 | A | 9/2014 |
| WO | WO2014/193841 | A1 | 12/2014 |
| WO | WO 2016/095739 | A1 | 6/2016 |

OTHER PUBLICATIONS

Japanese Search Report issued in Japanese Application No. 2017-532763 dated May 22, 2019, 36 pages.
PCT International Search Report and Written Opinion dated Mar. 1, 2016, issued in corresponding International Application No. PCT/CN2015/096797 (14 pages).
Office Action issued from The Japanese Patent Office in corresponding Japanese Application No. 2017-532763, dated Jun. 25, 2019, 2019 (13 pgs.).
First Chinese Office Action issued in Chinese Application No. 201410797833.5, dated May 3, 2018 (19 pages).
First Chinese Search Report issued in Chinese Application No. 201410797833.5, dated Apr. 24, 2018, 2018, (1 page).

* cited by examiner

DEVICE VERIFICATION METHOD AND APPARATUS

CROSS REFERENCE TO RELATED APPLICATION

This application claims priority to International Application No. PCT/CN2015/096797, filed on Dec. 9, 2015, and claims the priority of Chinese Application No. 201410797833.5, filed on Dec. 18, 2014, both of which are incorporated herein by reference in their entireties.

TECHNICAL FIELD

The embodiments of the present invention relate to network security technologies, and in particular, to device verification methods and apparatuses.

BACKGROUND

With the development of network technology, more attention is being paid to the issue of network security. For example, in many website services, a device performing a service needs to be identified. This identification can assist with determining whether the device is a safe device, to ensure the security of service processing. In current device verification technologies, however, a device is identified purely according to the hardware attributes of the device. This can lead to security hazard situations, e.g., forgery can easily occur, and the verification methods have a low reliability.

SUMMARY

In view of this, embodiments of the present invention provide device verification methods and apparatuses, to improve reliability of device verification.

Specifically, the present invention is implemented through the following technical solution:

In a first aspect, a device verification method is provided, the device verification method being used for verifying a target device requesting to perform a target service, the method including:

receiving a device verification request sent by the to-be-verified target device, the device verification request including: a device certificate and first device attribute information of the target device, the device certificate including a device fingerprint generated according to second device attribute information; and when it is confirmed according to the device fingerprint that the device certificate is valid, and the device fingerprint matches the first device attribute information, determining that the device certificate is a certificate of the target device, and allowing the target device to perform the target service.

In a second aspect, a device verification method is provided, the device verification method being used when sending a request to perform a target service to a server, the method including:

collecting first device attribute information; and sending a device verification request to the server, the device verification request including: a device certificate and the first device attribute information, the device certificate including a device fingerprint generated according to second device attribute information, such that the target service is performed when the server determines that the device fingerprint matches the first device attribute information.

In a third aspect, a device verification apparatus is provided, the apparatus being applied to a server, including:

a request receiving unit configured to receive a device verification request sent by a to-be-verified target device, the device verification request including: a device certificate and first device attribute information of the target device, and the device certificate including a device fingerprint generated according to second device attribute information; and a device verification unit configured to: when it is confirmed according to the device fingerprint that the device certificate is valid, and the device fingerprint matches the first device attribute information, determine that the device certificate is a certificate of the target device, and allow the target device to perform the target service.

In a fourth aspect, a device verification apparatus is provided, the apparatus being applied to a target device, including:

an information acquisition unit configured to collect first device attribute information; and a request sending unit configured to send a device verification request to a server, the device verification request including: a device certificate and the first device attribute information, the device certificate including a device fingerprint generated according to second device attribute information, such that the target service is performed when the server determines that the device fingerprint matches the first device attribute information.

In the device verification methods and apparatuses of the embodiments of the present invention, a target device carries a device certificate when requesting verification, the device certificate including a device fingerprint generated according to at least one device attribute. The target device is verified according to the device certificate and the device fingerprint, and the target device is allowed to access a service only when it is determined that the device fingerprint matches the device attribute of the target device and the certificate is a certificate of the target device. In this way, an illegal access device can be identified more efficiently, and device verification is more reliable.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
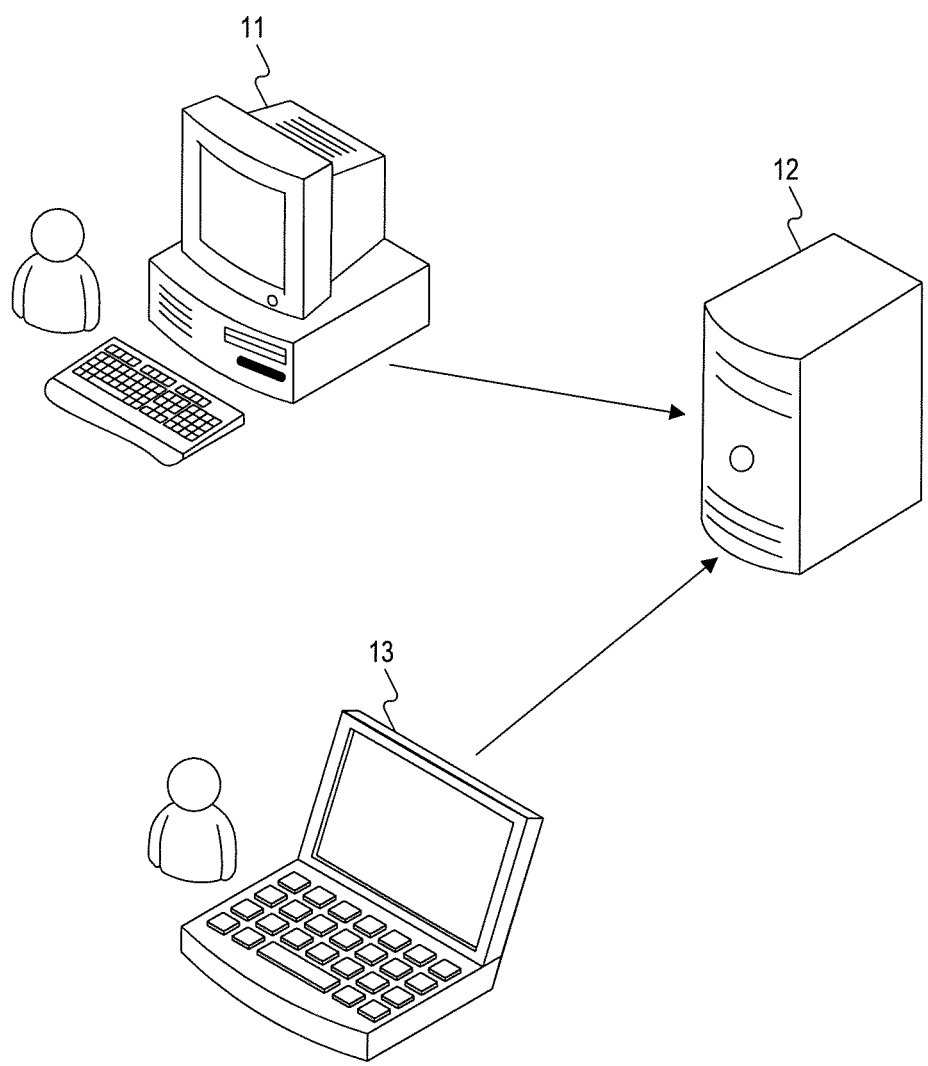
FIG. 1 is an exemplary application system diagram providing device verification, according to some embodiments of the present invention.

FIG. 1 is an exemplary application system diagram providing device verification, according to some embodiments of the present invention. As shown in FIG. 1, a user can use his/her computer 11 to perform a service requiring higher security. A server 12 may record a correspondence between an account of the user and the computer 11 usually used by the user. If the account of the user is used on the computer 11, the server 12 may consider that the service is conducted safely. If the server 12 finds that the account uses a computer 13 when requesting to perform a service, instead of the computer usually used by the user, the server 12 may suspect whether the account of the user has been illegally acquired by a hacker, and the hacker operates illegally by using the computer 13. In this case, the server 12 may disallow performance of the service. In some embodiments, the service can be a payment service on a website. In such embodiments, the payment service is, for example, a service operation such as the user paying for a service by using his/her own account provided by the server 12.

The above example is an application scenario of device verification, that is, a website server identifies a device (for example, a computer) to ensure the security of a service, to verify whether the service is conducted safely. The embodiments described herein of the device verification methods and systems provide a verification process that can help ensure that the verification result is more accurate and reliable. Moreover, it is appreciated that the example of device verification is not limited to the scenario shown in FIG. 1, and other similar scenarios may also adopt the device verification method according to the embodiments of the present invention.

Figure 2:
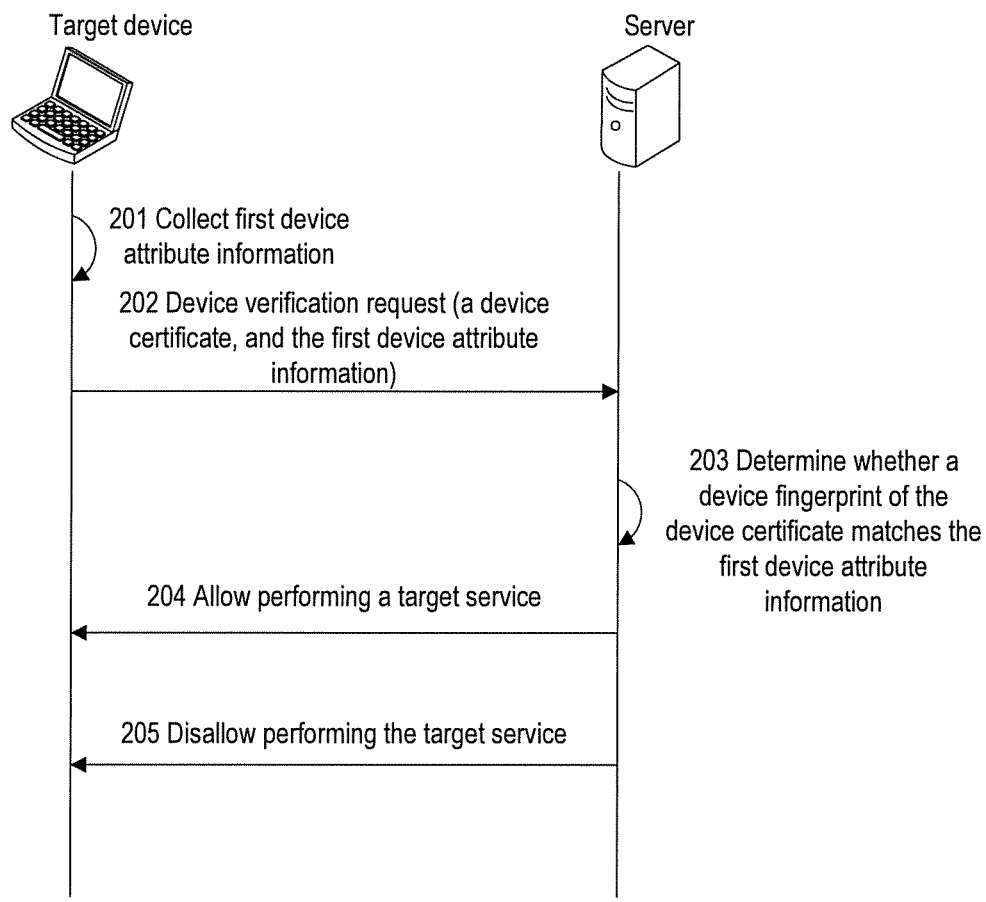
FIG. 2 is an exemplary schematic signaling diagram of a device verification method, according to some embodiments of the present invention.

FIG. 2 is an exemplary schematic signaling diagram of a device verification method, according to some embodiments of the present invention. As shown in FIG. 2, the method schematically shows a device verification flow performed between a device and a server. For example, the device can be used by a user to conduct a payment service. A server side may instruct the device to conduct verification to ensure the security of the service, and can allow the device to resume the service only after the verification is successful.

The following process describes the processing performed after the device receives the instruction of the server requesting it to be verified. The to-be-verified device may be referred to as a target device, and a service to be performed by the device is referred to as a target service.

201. The target device collects first device attribute information.

After the to-be-verified target device receives an instruction requesting verification of the device sent by the server, the target device can collect first device attribute information (the "first" is merely used for being distinguished from other attribute information appearing in the subsequent embodiments, and does not have other limitative meanings) corresponding to the target device itself. Specifically, the first device attribute information can include a hardware inherent attribute of the target device.

For example, by taking the target device being a computer as an example, the computer has various hardware components such as a network card, a display card, a CPU, and a memory chip. Attribute information of hardware as such can be collected. For example, for the display card, attributes of the display card may include, for example, model, name, delivery ID, resolution, and the like. These may all be referred to as attribute information of the hardware, which in this example, is the display card. Which attribute(s) is collected specifically, for example, whether the model or the delivery ID is collected, is not limited in this embodiment. However, there is a requirement for the acquired hardware attribute: the attribute is an inherent attribute of the hardware, that is, an unchanged attribute for the hardware. For example, still by using the display card as an example, a delivery ID or a model may be collected as these attributes are fixed and unchangeable; while resolution, although being an attribute of the display card, may be changed. For example, after a computer configuration is adjusted, the resolution may be increased or reduced, and such variable attribute information cannot be collected as the first device attribute information.

Moreover, there may usually be multiple pieces of first device attribute information collected in this step. For example, three pieces of attribute information or five pieces of attribute information may be collected. It is appreciated that the multiple pieces of attribute information may be multiple attributes corresponding to one piece of hardware or to multiple pieces of hardware respectively.

For example, assuming that three pieces of attribute information are collected, namely, an attribute A, an attribute B, and an attribute C, wherein the three attributes correspond to a same piece of hardware such as the display card. For example, these attributes can be a model, a delivery ID, and a name of the display card, respectively. Or the three attributes can correspond to different pieces of hardware respectively. For example, the attribute A is a model of the network card, the attribute B is a delivery ID of the display card, the attribute C is a model of the CPU, and the like. It is appreciated that there are other examples, which are not described in detail herein.

202. The target device sends a device verification request to the server, the request including: a device certificate and the first device attribute information of the target device. The device certificate can include a device fingerprint generated according to a second device attribute information.

After collecting the first device attribute information, the target device sends a device verification request to the server, to request the server to perform device verification on the target device. The verification request not only includes the first device attribute information collected in 201, but also includes a device certificate.

Generally, assuming that the target device has been deemed to be permitted user equipment by the server, a device certificate is issued by the server to the target device before the device verification process. The target device then stores the device certificate sent by the server for later providing the device certificate in the verification request in this step. The device certificate can include the device fingerprint generated according to the second device attribute information. The device fingerprint is a fingerprint generated by the target device according to its attributes, for example, the attributes listed in 201.

Assuming that the to-be-verified target device is an illegal device used by a hacker, the device certificate may be a device certificate of a permitted user (e.g., indicating that the device certificate was stolen by the hacker), the device fingerprint carried in the device certificate is still the fingerprint generated by the target device according to its attributes. The hacker cannot modify the device fingerprint included in the device certificate, since any modification made to the content of the device certificate may invalidate the certificate.

Optionally, the device certificate may be stored in a trusted platform module TPM of the target device, and the TPM hardware can provide more reliable security assurance for storage of the certificate.

203. The server can determine whether the first device attribute information matches the device fingerprint in the device certificate.

Before the server determines whether the first device attribute information matches the device fingerprint in the device certificate in this step, the server can further determine, according to the device fingerprint, whether the device certificate is valid. For example, when determining that the certificate is valid, the server may check whether the device fingerprint has been damaged. For example, the server may compare the device fingerprint in the certificate with a fingerprint previously stored in the server to determine whether the device fingerprint is damaged. The server may also use the device fingerprint to perform an integrity test to determine whether the certificate content is complete, and the like.

After the certificate is determined to be valid, the server compares the first device attribute information submitted by the target device in 202 with the device fingerprint in the certificate, to determine whether the two match each other.

Optionally, there may be two ways in which the first device attribute information can be determined to match the device fingerprint in the certificate. For example, the first device attribute information matches the second device attribute information. The first device attribute information collected by the target device includes: an attribute A, an attribute B, and an attribute C, and the second device attribute information for generating the device fingerprint in the certificate also includes: the attribute A, the attribute B, and the attribute C. That is, the device fingerprint is also generated according to the three attributes. In this case, it can be determined that the first device attribute information matches the second device attribute information, namely, the first device attribute information matches the device fingerprint in the certificate. For another example, another device fingerprint can be generated according to the first device attribute information collected by the target device: if it is determined that the another device fingerprint is the same as the device fingerprint in the device certificate, it indicates that the first device attribute information matches the device fingerprint in the certificate.

Further, when the first device attribute information matches the second device attribute information, the matching between the attribute information refers to: for example, corresponding attribute values in the first device attribute information and the second device attribute information are the same, or a proportion of the number of identical attribute values to the total number of attribute values reaches a preset proportion threshold.

For example, assuming that there are four attributes: an attribute A, an attribute B, an attribute C, and an attribute D, the server may compare whether the four attributes collected by the target device are identical to the four corresponding attributes in the device certificate. By taking a network card as an example, the attribute A in the device certificate can be a delivery ID of the network card, the first device attribute information collected by the target device also has a delivery ID of a network card of the target device. The server may compare whether the two delivery IDs are the same, namely, whether attributes of a corresponding type of the same hardware are the same. The above comparison can be used for each attribute in the certificate.

During the comparison, in some embodiments, there may be three cases. In one case, attribute values (the attribute values are, for example, delivery IDs of network cards) are the same. For example, the delivery IDs are identical. In another case, attribute values are different. For example, the delivery IDs are different, or models of display cards are different. In still another case, the collected attribute value is null. For example, one attribute in the device certificate is a model of a network card, but in the first device attribute information collected by the target device, the network card model is null, that is, no network card model is collected. This may be affected by a collection environment or other factors during collection, and the attribute is not acquired.

On the basis of the above three comparison cases, the matching between the attribute information may be defined. For example, corresponding attribute values in the first device attribute information and the second device attribute information need to be completely the same. Accordingly, the target device needs to collect every attribute value in the certificate, and the attribute values need to be the same. Only then can the server determine that the first device attribute information matches the second device attribute information.

For another example, corresponding attribute values in the first device attribute information and the second device attribute information need to be completely the same, while allowing some collected corresponding attributes to be null. However, it is not allowed that all collected attribute values are null. If no attribute value in the certificate is collected by the target device (meaning they are all null), the server may determine that the first device attribute information does not match the second device attribute information. If, for four attributes A, B, C, and D, only the attribute B is not collected by the target device and the other attribute values are the same, then the attribute B may be ignored. It may be determined that the first device attribute information matches the second device attribute information.

For another example, matching may be defined as: among corresponding attribute values in the first device attribute information and the second device attribute information, a proportion of the number of identical attribute values to the total number of attribute values reaches a preset proportion threshold. For example, in the above four attributes, when only one corresponding attribute is different during comparison, while the other three are the same, the proportion of the number of identical attribute values to the total number of attribute values is ¾, greater than a preset proportion threshold ½. Because the ¾ ratio is greater than the threshold, it can be determined that they match each other. On the other hand, if attribute values of three attributes are different, the proportion of the number of identical attribute values to the total number of attribute values is ¼, less than the preset proportion threshold ½, it can be determined that they do not match each other.

It is appreciated that the examples of the matching conditions described in the foregoing are merely examples, rather than exhaustive. In a specific implementation, the matching condition may be set flexibly according to the strictness degree of security control required by the device verification.

The attribute comparison in this step is herein illustrated in combination with the example of the application system shown in FIG. 1, to describe how the server determines whether the device is safe, namely, whether the device is a safe device or an illegal device:

In FIG. 1, assuming that the user is a permitted user, and uses his/her computer 11 to access the server 12. When the computer 11 sends a device verification request, a device certificate carried therein is a certificate issued by the server 12 to the computer 11. The second device attribute information in the certificate is attributes corresponding to the computer 11, for example, a display card attribute and a network card attribute of the computer 11. When the device verification request is sent, display card and network card attributes of the computer 11 are also in the first attribute information collected by the computer 11. The two pieces of attribute information are generally consistent when determined by the server side.

In contrast, in FIG. 1, assuming that the user is an illegal user who steals a device certificate corresponding to the permitted computer 11 of the user and accesses the server 12 through the computer 13, and assuming that when the computer 13 sends a device verification request, the device certificate carried therein is a certificate issued by the server 12 to the computer 11. The device fingerprint in the certificate is generated according to the attributes of the computer 11, but the first device attribute information collected by the computer 13 is hardware information corresponding to the computer 13. Therefore, the server side may determine that the device fingerprint and the first device attribute information do not match each other.

In this step, if the device certificate is determined to be valid according to the device fingerprint, and the determination result is that the device fingerprint in the device certificate matches the first device attribute information, it indicates that the device certificate is the certificate of the target device, and 204 is performed; otherwise, 205 is performed.

204. The server allows the target device to perform the target service.

In this step, the server may return a verification success response to the target device, or directly allow the target device to perform a subsequent service operation without returning a success response.

205. The server disallows the target device to perform the target service.

For example, the server returns a verification failure response to the target device, for example, when the illegal user uses the computer 13 to access the server as described in the above example, the user will be disallowed by the server from performing the service.

In the device verification method of this embodiment, the device fingerprint generated according to the device attribute information is carried in the device certificate issued for the device. During verification of the device, the device is allowed to perform the service only when the device attributes match the device fingerprint in the certificate, thus improving the security and reliability of device verification.

Figure 3:
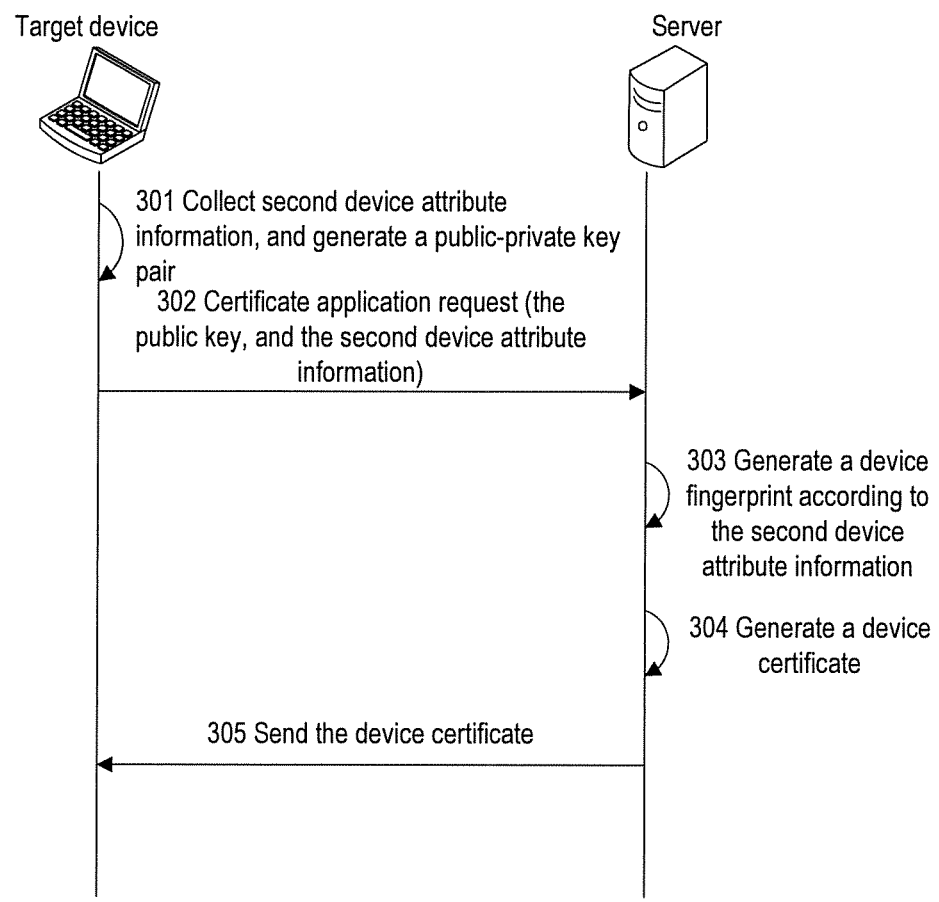
FIG. 3 is an exemplary schematic signaling diagram of another device verification method, according to some embodiments of the present invention.

In the above examples, the process of performing the device verification method is performed on the basis that the target device has stored the device certificate, and the target device only needs to carry the device certificate when sending the device verification request. The device certificate is issued by the server to the target device, and is acquired by the target device through applying to the server before performing the process of device verification. The applying for the certificate is described in detail in the following:

FIG. 3 an exemplary schematic signaling diagram of another device verification method, according to some embodiments of the present invention. The method describes a process where a device applies to a server for a certificate and how the server generates the certificate, including the following steps:

301. The target device collects second device attribute information, and generates a public-private key pair.

When a device certificate is made by the server, hardware attributes of the device are also set in the certificate. Therefore, when the target device applies for the certificate, collection of the hardware attributes of the device, which may be referred to as second device attribute information, needs to be performed. Such second device attribute information can then be submitted to the server, enabling the server to generate the device certificate accordingly.

It is appreciated that, in this step, the second device attribute information collected by the target device may not necessarily be completely identical to the attribute information in the device certificate correspondingly. For example, assuming that there are three attributes A, B, and C in the device certificate, the second device attribute information in this step may be that the target device collects all hardware inherent attributes of the target device itself, or collects five attributes, or the like. That is, the second device attribute information may include more than the attributes included in the device certificate, and the attributes in the device certificate are some attributes selected from the multiple attributes. For details, please refer to subsequent description of 303. It is appreciated that the second device attribute information may also be identical to the attributes in the certificate. For example, three attributes A, B, and C are collected, and the three attributes are also set in the certificate when the certificate is made.

Moreover, in addition to collecting the second device attribute information in this step, the target device further generates a public-private key pair, including a public key and a private key. The public key is used for generating a certificate in 304, and the private key is not transmitted to the server when the certificate is applied. For example, the private key may be used for encrypting information during information transmission after the verification succeeds: for example, information sent by the target device to the server can be encrypted by the private key, and the server decrypts the information by using the public key.

302. The target device sends a certificate application request to the server, the certificate application request including: the second device attribute information, and the public key in the public-private key pair.

When the target device sends the certificate application request to the server, the second device attribute information collected in 301 and the public key in the generated pub-private key pair can be carried therein.

Optionally, the target device applies to the server for the device certificate, and the application may be initiated to the server in the two cases listed as follows:

In one case, the target device finds that it does not store a device certificate. Since the certificate is sent by the server to the device, the certificate can be stored in the device, and when the device requests the server to perform device verification, the certificate is carried in the device verification request. If the target device confirms that no device certificate is stored locally, device verification cannot be performed subsequently, and therefore, the target device may initiate a certificate application.

In another case, when the target device receives the verification failure response returned by the server (e.g., before the application for a certificate by the target device this time), the target device may have used a certificate of another device to request the server for verification, and as a result, the server determines that attribute information does not match and returns verification failure. The verification failure indicates that the device certificate is not the certificate of the device, and therefore, the target device needs to apply for its own device certificate.

303. The server generates a device fingerprint according to the second device attribute information.

In this step, if the number of attributes in the second device attribute information collected by the target device is greater than the number of pieces of attribute information to be used for generating the device fingerprint, attributes may be selected from the second device attribute information. If the number of attributes in the second device attribute information collected by the target device is the same as the number of attributes to be used for generating the device fingerprint, the fingerprint may be generated based on all of them.

In the foregoing, the acquisition of the second device attribute information based on which the device fingerprint is generated is described in terms of the number of attributes. Assuming that the collected second device attribute information includes: an attribute A (for example, a CPU model), an attribute B (for example, a network card model), an attribute C (for example, a delivery ID of a display card) and an attribute D (for example, a name of a memory), when acquiring attributes based on which the fingerprint is generated, such information can be further processed, for example, in a manner illustrated as follows:

TABLE 1

Hash value taken for attribute value

| Attribute | Hash value |
|---|---|
| Attribute A | Hash value of the attribute A |
| Attribute B | Hash value of the attribute B |
| Attribute C | Hash value of the attribute C |
| Attribute D | Hash value of the attribute D |

As shown in the above Table 1, the target device takes hash values for attribute values of the collected four pieces of attribute information, to ensure security of transmission. The hash values of the collected attribute values are transmitted to the server. At the server side, the hash values of these attributes can be combined, to form a device fingerprint for identifying the target device.

For example: by taking selection of some attributes from the second device attribute information as an example, the second device attribute information includes multiple attribute values, each attribute value corresponding to a device inherent attribute of the target device, for example, the four attribute values in the above Table 1. The server selects a preset number of attribute values from the four attributes, for example, in this embodiment, three attribute values A, B, and C are selected, and these attribute values are combined to generate fingerprint information of the device. The combination may be performed according to the following manner: taking, the attribute A, the hash value of the attribute A, the attribute B, the hash value of the attribute B, the attribute C, and the hash value of the attribute C, as shown in the above Table 1, and synthesizing them all to take hash, to serve as the device fingerprint information. It is appreciated that, there may also be other combination manners, as long as related information of the three attributes is included, which are not described in detail herein.

It is appreciated that, the manner of generating the device fingerprint by selecting some attributes from the second device attribute information as described in the foregoing can enable device verification to be more reliable and safer. This is because: suppose that the target device collects all hardware inherent attributes thereof, the target device cannot know which attributes will be selected by the server to generate the device fingerprint accordingly. An illegal user such as a hacker does not know which attributes are included in the device certificate, so that the hacker, even he/she intends to forge attributes (for example, the hacker tampers with hardware attributes of a legal device when reporting a device verification request, replacing them with his/her own hardware attributes), he/she cannot know which attributes need to be forged. Therefore, the embodiment as described above increases the difficulty for illegal conducts of the hacker, and the verification manner has higher reliability.

Moreover, the target device may record the hardware inherent attributes that are collected by the target device when applying for the certificate. In this way, the same device attributes may be collected when device verification is requested subsequently, to make sure that the attribute information collected includes the corresponding attributes in the device certificate. The server can then match and compare the attributes.

304. The server generates a device certificate including the device fingerprint and the public key.

The following Table 2, in a simplified manner, shows a structure of the device certificate generated in this step:

TABLE 2

Structure of a device certificate

| Main information of the certificate | Extended information of the certificate |
|---|---|
| Public key with a signature | Device fingerprint |

As shown in the above Table 2, the device certificate is a digital certificate having the device fingerprint included in the extended information of the certificate. The digital certificate can be, for example, a certificate in an X.509 V3 format. Detailed description of the generation of the device fingerprint may be found in the description in 303. The device certificate further includes a public key with a CA signature, and the public key is a public key in the public-private key pair generated by the target device. Damaging the information can invalidate the certificate.

Moreover, when the device certificate is generated, a certificate serial number can also be generated as an inherent attribute of the certificate. The server side may record a correspondence between the generated device certificate and the device fingerprint. Specifically, the server side may record, for example, a correspondence between the certificate serial number of the certificate and the device fingerprint, and the device inherent attribute (the attribute refers to the attribute based on which the fingerprint is generated) as well. As shown in the following Table 3:

TABLE 3

Device certificate correspondence

| Certificate serial number | Device fingerprint | Device inherent attribute | Certificate generation time | Certificate use time |
|---|---|---|---|---|
| | | Attribute A<br>Attribute B<br>Attribute C | ##### | **** |

After the correspondence of Table 3 is recorded, when the server receives the device certificate (including the certificate attribute of certificate serial number) carried in the device verification request sent by the target device subsequently, the server may look up in data storage the information of Table 3 according to the certificate serial number, to acquire the attribute A, the attribute B, and the attribute C corresponding to the device fingerprint, which corresponds to the device certificate. The server can then compare the attributes with the first device attribute information collected by the target device, to determine whether they match each other.

It should be appreciated that the certificate serial number also enables the device verification to be more reliable. For example, suppose that attributes of two devices are the same, such as models of network cards and delivery IDs of display cards are all the same. When the two devices apply for a device certificate, the server may issue device certificates for the two devices, and device fingerprints carried in the device certificates may be the same. However, each certificate corresponds to a unique certificate serial number, the certificate serial numbers of the two device certificates are different. This way, the server can still distinguish the two devices.

In other words, when receiving the device verification request of the target device, the server can not only match and compare the device attribute information described in the above example, but can also perform some basic certificate validation. For example, the server may perform certificate validation to see whether serial numbers of the certificates are the same, whether the certificate is within a term of validity, whether certificate information is complete or damaged, or the like.

305. The server sends the device certificate to the target device.

The device verification method can use the mechanism of combining the digital certificate and the device fingerprint, such that the device fingerprint in the certificate is unforgeable, as the digital certificate is unforgeable. Meanwhile, the uniqueness of the digital certificate is also used, thus greatly improving the reliability of the device verification.

Figure 4:
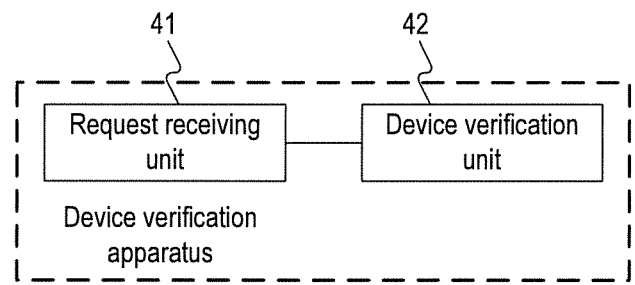
FIG. 4 is an exemplary schematic structural diagram of a device verification apparatus, according to some embodiments of the present invention.

Embodiments of device verification apparatuses are further provided as follows, to implement the device verification methods described above by using the apparatuses:

FIG. 4 is an exemplary schematic structural diagram of a device verification apparatus, according to some embodiments of the present invention. The apparatus may be applied to a server, for example, software set in a server terminal. As shown in FIG. 4, the apparatus may include: a request receiving unit 41 and a device verification unit 42; wherein:

Request receiving unit 41 is configured to: receive a device verification request sent by the to-be-verified target device, the device verification request including a device certificate and first device attribute information of the target device, the device certificate including a device fingerprint generated according to second device attribute information; and Device verification unit 42 is configured to: when it is confirmed according to the device fingerprint that the device certificate is valid, and the device fingerprint matches the first device attribute information, determine that the device certificate is a certificate of the target device, and allow the target device to perform a target service.

Figure 5:
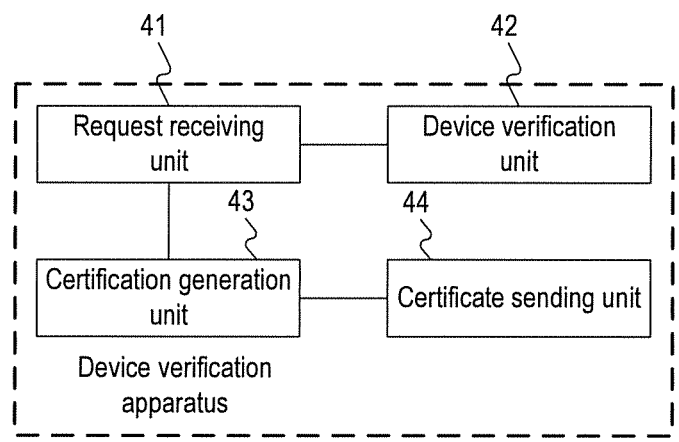
FIG. 5 is an exemplary schematic structural diagram of another device verification apparatus, according to some embodiments of the present invention.

FIG. 5 is an exemplary schematic structural diagram of another device verification apparatus, according to some embodiments of the present invention. On the basis of the structure shown in FIG. 4, this apparatus embodiment further includes: a certificate generation unit 43 and a certificate sending unit 44; wherein:

Request receiving unit 41 is further configured to: receive a certificate application request sent by the target device, the certificate application request including second device attribute information collected by the target device;

Certificate generation unit 43 is configured to: generate the device fingerprint according to the second device attribute information, and set the device fingerprint in the generated device certificate; and Certificate sending unit 44 is configured to send the device certificate to the target device.

Further, the certificate generation unit 43, when generating the device fingerprint according to the second device attribute information, can be further configured to: select a preset number of attribute values from multiple attribute values included in the second device attribute information, and combine the preset number of attribute values to generate the device fingerprint for identifying the target device. Each attribute value corresponds to a device inherent attribute of the target device.

Figure 6:
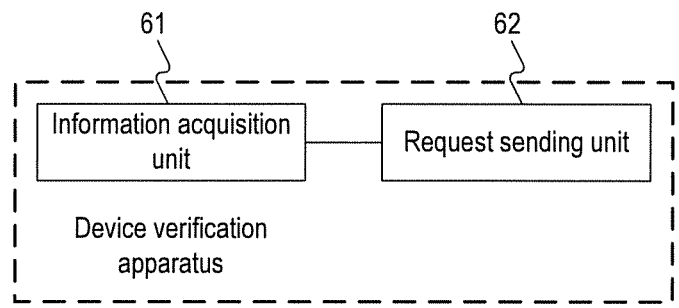
FIG. 6 is an exemplary schematic structural diagram of another device verification apparatus, according to some embodiments of the present invention.

FIG. 6 is an exemplary schematic structural diagram of another device verification apparatus, according to some embodiments of the present invention. The apparatus may be applied to a target device, for example, client terminal software set at a target device side. As shown in FIG. 6, the apparatus may include: an information acquisition unit 61 and a request sending unit 62; wherein:

Information acquisition unit 61 is configured to: collect first device attribute information; and Request sending unit 62 is configured to: send a device verification request to the server, the device verification request including a device certificate and the first device attribute information, the device certificate including a device fingerprint generated according to second device attribute information. The target service is performed when the server determines that the device fingerprint matches the first device attribute information.

Figure 7:
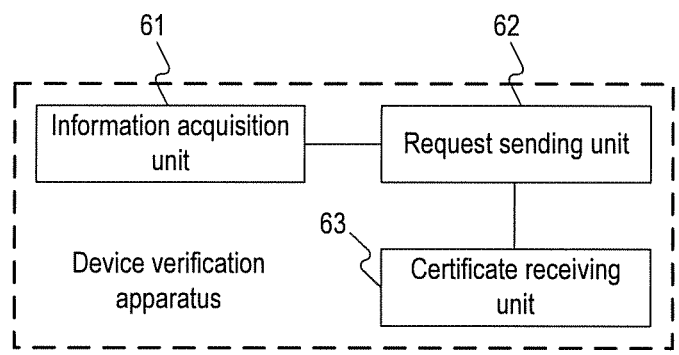
FIG. 7 is an exemplary schematic structural diagram of another device verification apparatus, according to some embodiments of the present invention.

FIG. 7 is an exemplary schematic structural diagram of another device verification apparatus, according to some embodiments of the present invention. On the basis of the structure shown in FIG. 6, this apparatus embodiment further includes: a certificate receiving unit 63; wherein:

Information acquisition unit 61 is further configured to: collect the second device attribute information;

Request sending unit 62 is further configured to: send a certificate application request to the server, the certificate application request including the second device attribute information, such that the server generates a device fingerprint according to the second device attribute information and sets the device fingerprint in the device certificate; and Certificate receiving unit 63 is configured to: receive the device certificate returned by the server.

Further, the request sending unit 62 can be further configured to: send the certificate application request when it is confirmed that no device certificate is stored locally, or when a verification failure response is returned by the server is received.

In general, the word "unit," as used herein, can be a packaged functional hardware unit designed for use with other components (e.g., portions of an integrated circuit) or a part of a program (stored on a computer readable medium) that performs a particular function of related functions. The unit can have entry and exit points and can be written in a programming language, such as, for example, Java, Lua, C or C++. A software unit or module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware units can be comprised of connected logic units, such as gates and flip-flops, and/or can be comprised of programmable units, such as programmable gate arrays or processors. Generally, the units described herein refer to logical units that can be combined with other units or divided into sub-units despite their physical organization or storage.

The above are merely preferred embodiments of the present invention, and are not intended to limit the present invention. Any modifications, equivalent replacements, improvements, and the like made within the spirit and principles of the present invention shall all fall within the protection scope of the present invention.

What is claimed is:

1. A device verification method for verifying a target device requesting to perform a target service, the method comprising:
    receiving a certificate application request sent by the target device, the certificate application request comprising: a first device attribute information collected by the target device, wherein the first device attribute information comprises multiple attribute values, each attribute value corresponding to a device attribute of the target device;
    generating a device fingerprint according to the first device attribute information, wherein generating a device fingerprint according to the first device attribute information comprises:
        selecting a preset number of attribute values from the multiple attribute values, and
        combining the preset number of attribute values to generate the device fingerprint;
    sending a device certificate to the target device, wherein the device certificate includes the device fingerprint;
    receiving a device verification request sent by the target device, the device verification request comprising: the device certificate and second device attribute information of the target device, and the device certificate comprising the device fingerprint generated according to the first device attribute information;
    determining whether the device fingerprint is consistent with the second device attribute information; and
    in response to a determination that the device fingerprint is consistent with the second attribute information, allowing the target device to perform the target service.

2. The method of claim 1, wherein the determining that device fingerprint is consistent with the second device attribute information comprises:
    the second device attribute information matching at least some of the first device attribute information; or
    generating another device fingerprint according to the second device attribute information, and another device fingerprint matching the device fingerprint in the device certificate.

3. The method of claim 2, wherein the second device attribute information matching at least some of the first device attribute information comprises:
    corresponding attribute values in the second device attribute information and the first device attribute information being the same; or
    a proportion of the number of identical attribute values to the total number of attribute values satisfying a preset proportion threshold.

4. The method of claim 1, wherein the method further comprises:
    determining whether the device certificate is valid, based on the device fingerprint.

5. A device verification method used when sending a request to perform a target service to a server, the method comprising:
    collecting first device attribute information that comprises multiple attribute values, each attribute value corresponding to a device attribute of the target device;
    sending a certificate application request to the server, wherein the certificate application request includes the first device attribute information that is used for generating the device fingerprint, wherein the device fingerprint is obtained according to a combination of a preset number of attribute values selected from the multiple attribute values and is used for identifying the target device;
    receiving the device certificate returned by the server;
    collecting second device attribute information;
    sending a device verification request to the server, the device verification request comprising: a device certificate and the second device attribute information, the device certificate comprising a device fingerprint generated according to the first device attribute information; and
    performing the target service based on a determination that the device fingerprint is consistent with the second device attribute information.

6. The method of claim 5, wherein, before the sending a certificate application request to the server, the method further comprises:
    confirming that no device certificate is stored locally; or,
    receiving a verification failure response returned by the server.

7. The method of claim 5, wherein the device certificate is stored in a trusted platform module TPM.

8. A device verification apparatus, wherein the apparatus is applied to a server, comprising:
    a request receiving unit configured to:
        receive a certificate application request sent by a target device, the certificate application request comprising: first device attribute information collected by the target device, and
        receive a device verification request sent by the target device, the device verification request comprising: a device certificate and second device attribute information of the target device, and the device certificate comprising a device fingerprint generated according to the first device attribute information;
    a device verification unit configured to:
        determine whether the device fingerprint is consistent with the second device attribute information, and
        in response to the determination that the fingerprint is consistent with the second device attribute information, allow the target device to perform a target service;

a certificate generation unit configured to:
  generate the device fingerprint according to the first device attribute information,
  select a preset number of attribute values from multiple attribute values comprised in the first device attribute information, and
  combine the preset number of attribute values to generate the device fingerprint, wherein each attribute value corresponds to a device attribute of the target device; and
a certificate sending unit configured to:
  send the device certificate to the target device, wherein the device certificate includes the device fingerprint.

9. A device verification apparatus, wherein the apparatus is applied to a target device, comprising:
  an information acquisition unit configured to:
    collect first device attribute information that comprises multiple attribute values, each attribute value corresponding to a device attribute of the target device,
    send a certificate application request to the server, wherein the certificate application request includes the first device attribute information that is used for generating the device fingerprint, wherein the device fingerprint is obtained according to a combination of a preset number of attribute values selected from the multiple attribute values and is used for identifying the target device,
    receive a device certificate returned by the server, and collect second device attribute information; and
  a request sending unit configured to send a device verification request to the server, the device verification request comprising: the device certificate and the second device attribute information, the device certificate comprising a device fingerprint generated according to the first device attribute information,
  wherein:
    the target service is performed based on a determination that the device fingerprint is consistent with the second device attribute information.

10. The apparatus of claim 9, wherein,
  the request sending unit is further configured to send a certificate application request to the server, the certificate application request includes the first device attribute information that is used for generating the device fingerprint; and
  the apparatus further comprises a certificate receiving unit configured to receive the device certificate returned by the server.

11. The apparatus of claim 10, wherein, the request sending unit is further configured to send the certificate application request after:
  confirming that no device certificate is stored locally, or
  receiving a verification failure response returned by the server.

12. A non-transitory computer readable medium that stores a set of instructions that is executable by at least one processor of to a device verification apparatus to perform a method for verifying a target device, the method comprising:
  receiving a certificate application request sent by the target device, the certificate application request comprising first device attribute information collected by the target device, wherein the first device attribute information comprises multiple attribute values, each attribute value corresponding to a device attribute of the target device;
  generating the device fingerprint according to the first device attribute information, wherein generating the device fingerprint according to the first device attribute information further comprises:
    selecting a preset number of attribute values from the multiple attribute values, and
    combining the preset number of attribute values to generate the device fingerprint;
  sending a device certificate to the target device, wherein the device certificate includes the device fingerprint;
  receiving a device verification request sent by the target device, the device verification request comprising: the device certificate and second device attribute information of the target device, and the device certificate comprising a device fingerprint generated according to the first device attribute information;
  determining whether the device fingerprint is consistent with the second device attribute information; and
  in response to a determination that the device fingerprint is consistent with the second attribute information, allowing the target device to perform the target service.

13. The non-transitory computer readable medium of claim 12, the determining that device fingerprint is consistent with the second device attribute information comprises:
  the second device attribute information matching at least some of the first device attribute information; or
  generating another device fingerprint according to the second device attribute information, and another device fingerprint matching the device fingerprint in the device certificate.

14. A non-transitory computer readable medium that stores a set of instructions that is executable by at least one processor of to cause a device verification apparatus to perform a method for verifying a target device, the method comprising:
  collecting first device attribute information that comprises multiple attribute values, each attribute value corresponding to a device attribute of the target device;
  sending a certificate application request to the server, wherein the certificate application request includes the first device attribute information that is used for generating the device fingerprint, wherein the device fingerprint is obtained according to a combination of a preset number of attribute values selected from the multiple attribute values and is used for identifying the target device;
  receiving a device certificate returned by the server;
  collecting second device attribute information;
  sending a device verification request to the server, the device verification request comprising: the device certificate and the second device attribute information, the device certificate comprising a device fingerprint generated according to the first device attribute information; and
  performing such that the target service is performed based on a determination when the server determines that the device fingerprint is consistent with the second device attribute information.

* * * * *